(12) United States Patent
Park et al.

(10) Patent No.: US 8,055,277 B2
(45) Date of Patent: Nov. 8, 2011

(54) CUSTOMIZED LOCATION TRACKING SERVICE

(75) Inventors: Sun-Ok Park, Daejeon (KR); Mi Young Huh, Daejeon (KR); Shin Gak Kang, Daejeon (KR); Jae Cheon Han, Goyang (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 882 days.

(21) Appl. No.: 11/924,612

(22) Filed: Oct. 26, 2007

(65) Prior Publication Data

US 2008/0133730 A1 Jun. 5, 2008

(30) Foreign Application Priority Data

Dec. 5, 2006 (KR) .................. 10-2006-0122635

(51) Int. Cl.
*H04Q 7/20* (2006.01)
(52) U.S. Cl. ............... 455/456.5; 455/456.1; 455/456.6; 340/539.13
(58) Field of Classification Search ............... 455/456.5, 455/456.1, 456.6; 340/539.13
See application file for complete search history.

(56) References Cited

U.S. PATENT DOCUMENTS

2003/0050038 A1* 3/2003 Haave et al. .................. 455/404
2006/0189326 A1* 8/2006 Black et al. ................ 455/456.1

FOREIGN PATENT DOCUMENTS

| JP | 10-028283 | 1/1998 |
| KR | 10-2001-0044912 A | 6/2001 |
| KR | 1020020004534 A | 1/2002 |
| KR | 1020030015414 A | 2/2003 |
| KR | 10-2003-0041425 A | 5/2003 |
| KR | 1020040104195 A | 12/2004 |
| KR | 10-2005-0071999 A | 7/2005 |
| KR | 10-2005-0092972 A | 9/2005 |
| KR | 10-2005-0098557 A | 10/2005 |

* cited by examiner

*Primary Examiner* — Danh Le

(57) ABSTRACT

Provided is a method in which a tracker configures a notification condition on the basis of an authorization policy predetermined by a trackee so that a location information server provides a customized location tracking service according to the notification condition. The method includes: (a) registering an authorization policy of a trackee in order to determine whether a location tracking service requested by a tracker will be accepted; (b) configuring a customized location information notification condition by a tracker; (c) requesting the customized location tracking service by the tracker; and (d) providing the customized location tracking service by a location information server on the basis of the configured authorization policy and the customized location information notification condition.

10 Claims, 6 Drawing Sheets

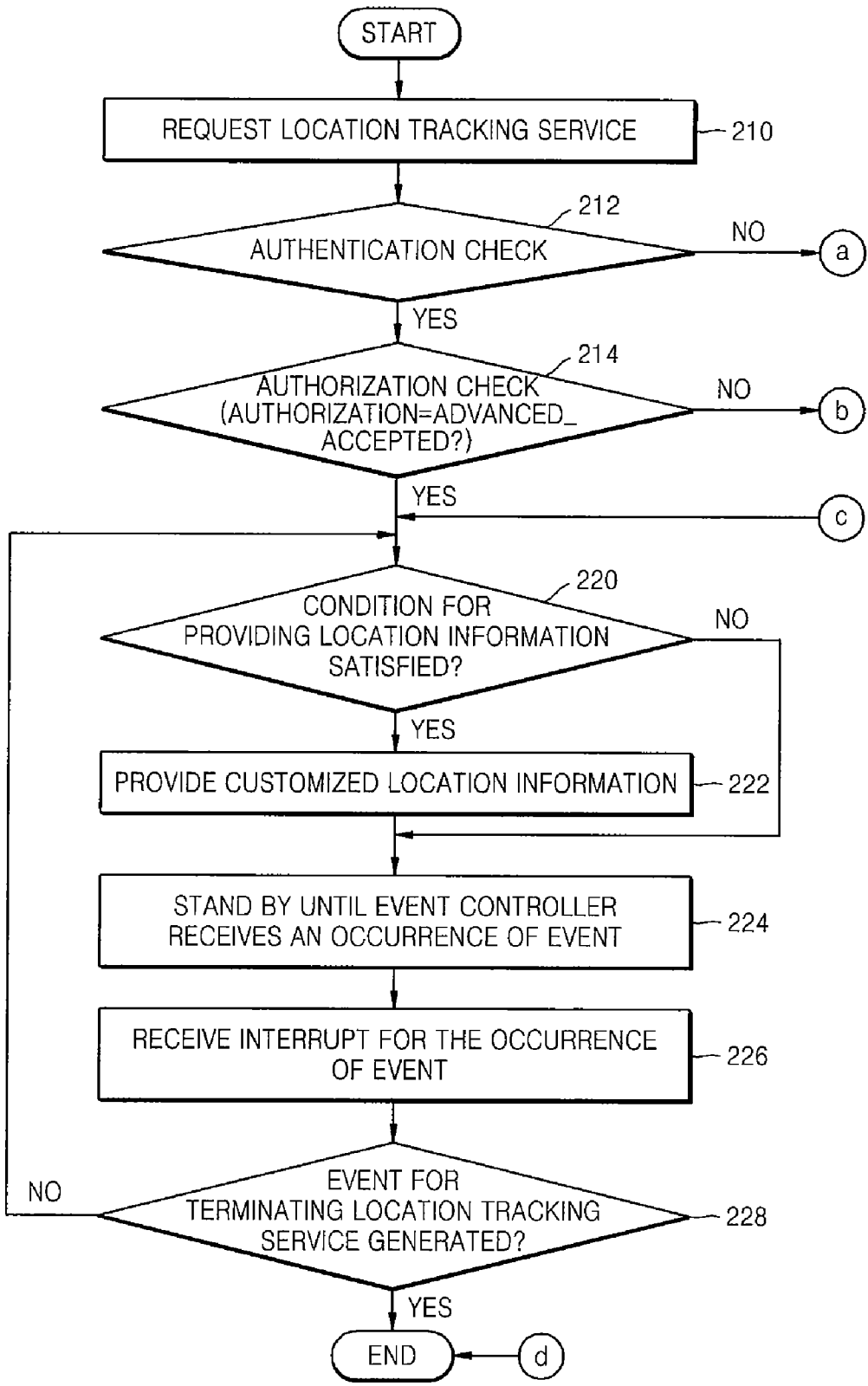

CUSTOMIZED LOCATION TRACKING SERVICE

CROSS-REFERENCE TO RELATED PATENT APPLICATION

This application claims the benefit of Korean Patent Application No. 10-2006-0122635, filed on Dec. 5, 2006, in the Korean Intellectual Property Office, the disclosure of which is incorporated herein in its entirety by reference.

BACKGROUND OF THE INVENTION

1. Field of the Invention

The present invention relates to providing a customized location tracking service which provides location information when a certain condition is satisfied according to a predetermined policy of notifying location information when the customized location tracking service is requested once, and more particularly, to a method of providing the customized location tracking service in which the path of a trackee is received, or the trackee's presence in a specific area is indicated, at a specific time slot or at a periodical time interval, by determining a temporal notification condition and/or a spatial/local notification condition.

The present invention also relates to providing a tracking device required to provide the customized location tracking service, a tracked mobile terminal, a location information server providing the location tracking service according to a notification condition, and a system.

This work was supported by the IT R&D program of MIC/IITA. [2006-P10-39, *A Study on Standarization for MoIP Applications and VoIP Interworking*.]

2. Description of the Related Art

With the explosive growth of their use, mobile communication terminals are now regarded as personal necessities of life. This has resulted in a growing demand from users who want a variety of value added services. A mobile terminal can be used while in motion, for locating a user who carries the mobile terminal. Such a location tracking service may be used in various fields, for example, to track down an offender by locating a terminal that has been used in a crime, to find a lost child, to find a friend, and to find a lost mobile terminal.

In the conventional location tracking service using a mobile terminal, when a location tracking service is asked the location of a tracked mobile terminal, only the current location information on the tracked mobile terminal is intermittently provided. Thus, in order to know the path of a certain mobile terminal, the location tracking service has to be periodically requested, which is inconvenient. Also, the location tracking service can be provided only at the request of the tracked mobile terminal. In response to the request, the location information is intermittently transmitted to a tracker. Therefore, a service such as a path tracking service cannot be achieved at a specific time slot.

Besides this problem, the conventional location tracking service lacks various applications, for example, an application service based on a geographical location, which would enable various applications. For example, a proxy driving service provider may attempt to send a short message service (SMS) publicity message to customers who have an experience of using a proxy driving service. In order to increase the possibility of providing the proxy driving service, the message may be sent to target customers who dine with coworkers after work in an area where the proxy driving service is available. In addition, an advertisement message may be not sent to customers who do not need the service. Parents at home could monitor the whereabouts of their children whenever the children are more than a certain distance from home. Therefore, this method may be used to prevent a lost child or a crime such as kidnapping.

SUMMARY OF THE INVENTION

The present invention provides a customized location tracking service which provides location information when a certain condition is satisfied according to a predetermined policy of notifying location information when the customized location tracking service is requested once, and more particularly, to a method of providing the customized location tracking service in which the path of a trackee is received, or the trackee's presence in a specific area is indicated, at a specific time slot or at a periodical time interval, by determining a temporal notification condition and/or a spatial/local notification condition.

The present invention also provides a tracking device required to provide the customized location tracking service, a tracked mobile terminal, a location information server providing the location tracking service according to a notification condition, and a system.

According to an aspect of the present invention, there is provided a method of providing a customized location tracking service, including: (a) registering an authorization policy of a trackee in order to determine whether a location tracking service requested by a tracker will be accepted; (b) configuring a customized location information notification condition by a tracker; (c) requesting the customized location tracking service by the tracker; and (d) providing the customized location tracking service by a location information server on the basis of the registered authorization policy and the customized location information notification condition.

The authorization policy of the trackee may include: a policy that accepts only an intermittent location tracking service; a customized location tracking policy; a pending policy or non-configuration policy that does not determine an additional authorization policy; and a policy that rejects the location tracking service, and the customized location tracking service may be provided by the location information server on the basis of the location information notification condition only when the authorization policy is configured to the customized location tracking policy.

If the authorization policy of the trackee is the policy that accepts only an intermittent location tracking service, the customized location tracking service may be terminated after providing an intermittent service for notifying information on the current location of the trackee, and if the authorization policy of the trackee is the policy that rejects the location tracking service, the customized location tracking service may be terminated without having to provide an additional service.

If the authorization policy of the trackee is the pending policy or the non-configuration policy that does not determine an additional authorization policy, in (d), the registration of the authorization policy of the trackee may be resumed by additionally inquiring the trackee whether the authorization policy for the tracker will be accepted.

The location information notification condition may be a local location information condition and/or a temporal location information condition. A local domain may be determined by the local location information condition, and/or the local location information condition may be satisfied when the trackee enters and/or may leave the specific area.

The temporal location information condition may be satisfied when the location information is periodically transmitted, and/or when the location information is transmitted at a specific time slot, and/or when the location information may be transmitted at one or more different time points.

The method may further include authenticating the tracker by the location information server prior to the provision of the customized location tracking service on the basis of the determined authorization policy and the location information notification condition after the customized location tracking service is requested by the tracker. When the tracker requests the customized location tracking service, the request may further include authentication information on the tracker in order to authenticate the tracker.

The method may further include, prior to the authenticating of the tracker by the location information server, establishing a secure channel between a tracking mobile terminal and the location information server before the authentication information on the tracker is sent from the tracking mobile terminal to the location information server.

The location tracking service may be terminated when the authentication on the tracker is not successful.

According to another aspect of the present invention, there is provided a tracking device requesting a customized location tracking service, including: a notification condition configuration unit that configures a location information notification condition of a trackee; a service requester that requests a location information server to provide a location information service on the basis of the location information notification condition; and a service receiver that receives the requested location information service from the location information server.

The tracking device may further include a display unit that displays the received location information.

According to another aspect of the present invention, there is provided a mobile terminal device used in a location tracking service, including: a notification condition configuration unit that configures a location information notification condition of a trackee; a service requester that requests a location information server to provide a location information service on the basis of the location information notification condition; a service receiver that receives the requested location information service from the location information server, a display unit that displays the notification condition and/or the received service; a location information receiver that receives a request sent from the location information server to obtain the location information; and a location information transmitter that transmits the requested location information to the location information server.

According to another aspect of the present invention, there is provided a location information server providing a customized location tracking service, including: a service request receiver that receives from a tracking device a service request so as to obtain location information on a tracked device; a notification condition analyzer that analyzes a notification condition requested by the tracking device; a location information requester that requests the tracked device to provide location information on the basis of the notification condition in response to the service request; an information receiver that receives the location information from the tracked device; and a service transmitter that transmits the received location information to the tracking device on the basis of the notification condition.

The location information server may further include a user authentication check unit that checks for authentication information on a tracker.

The location information server may further include a buffer that stores the location information on the tracked device.

According to another aspect of the present invention, there is provided a system providing a customized location tracking service, including: a tracking device that requests a location information service; a location information server that wirelessly requests a tracked device to provide location information when the location information service is requested and then provides the location information service on the basis of a notification condition of the tracking device; and a tracked mobile terminal that provides the location information when the location information server requests the location information.

The tracking device and the location information server may communicate with each other by a wired network and/or a wireless network.

A secure channel may be established between the tracking device and the location information server in order to exchange user authentication information.

BRIEF DESCRIPTION OF THE DRAWINGS

The above and other features and advantages of the present invention will become more apparent by describing in detail exemplary embodiments thereof with reference to the attached drawings in which:

FIG. 2A is a flowchart of a procedure performed by a location information server that provides a customized location tracking service on the basis of an authorization policy according to an embodiment of the present invention;

DETAILED DESCRIPTION OF THE INVENTION

Exemplary embodiments of the present invention will now be described in detail with reference to the accompanying drawings.

In the following description, well-known functions or elements are not described in detail since they would obscure the invention in unnecessary detail. The meaning of terminology used herein should be interpreted in consideration of the context of the present invention, and may vary depending on the user's or operator's intention, or customs in the art. Therefore, all meaning should be determined with reference to the entire specification.

Figure 1:
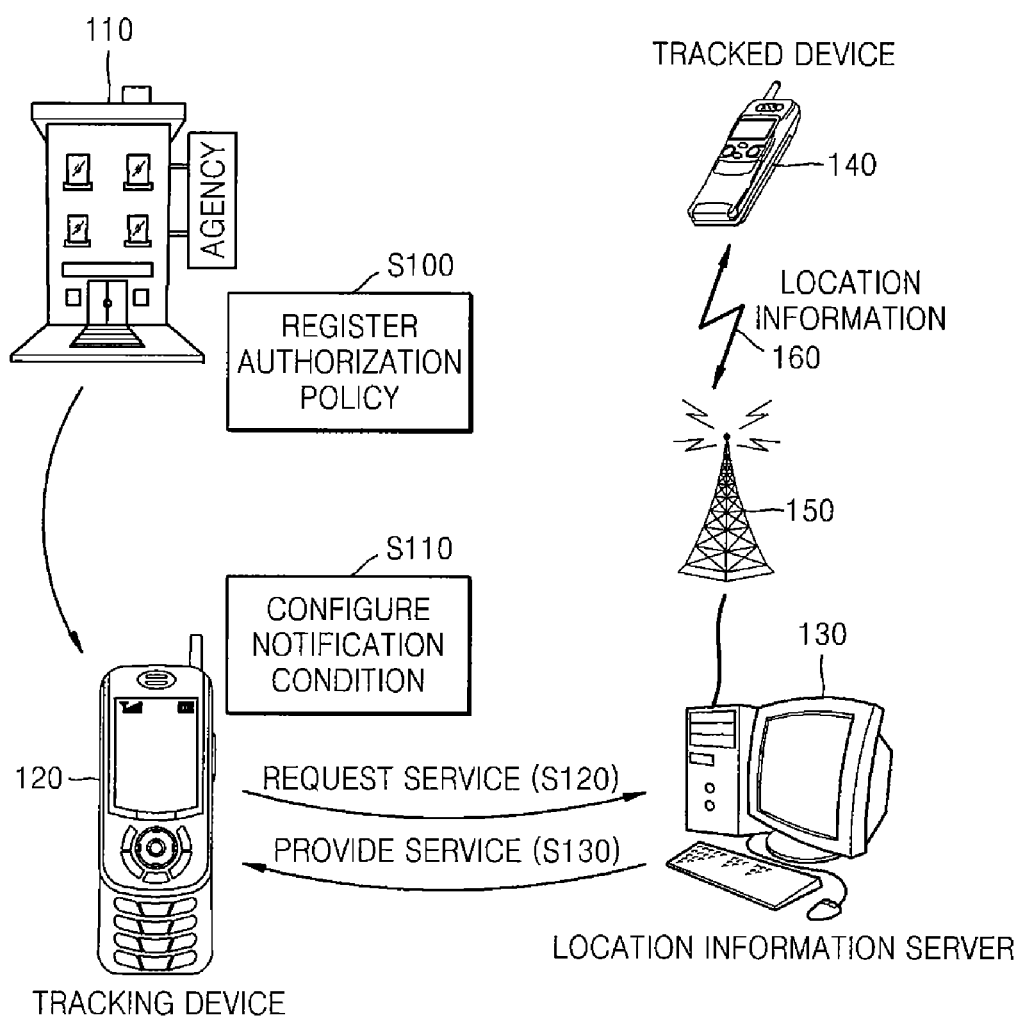
FIG. 1 is a schematic view illustrating a customized location tracking service according to an embodiment of the present invention.

FIG. 1 is a schematic view illustrating a customized location tracking service according to an embodiment of the present invention. Referring to FIG. 1, in order to provide the customized location tracking service to a tracker, the tracker performs operation S120 of requesting the location tracking service. Operation S100 of registering an authorization policy has to be performed by a trackee before the location tracking service is requested. The registration of the authorization policy, as shown in FIG. 1, may be performed by an agency 110 of a mobile communication provider. The agency 110 of FIG. 1 is shown only as an example. Thus, the authorization policy registration may be achieved via a service center, a telephone, or a Web site over the Internet (all of which not shown). That is, any method may be used as long as the authorization policy is achieved for providing service. Examples of the authorization policy may include (1) a policy that accepts only a conventional intermittent location tracking service, (2) a policy that accepts a customized location tracking service, (3) a pending policy or non-configuration policy that does not determine an additional authorization policy, and (4) a policy that rejects a location tracking service. Among these policies (1) through (4), the customized location tracking service of the present invention will be fully provided when the policy of (1) is determined, and will be restrictively provided when the policy of (3) is determined. Details of these policies (1) through (4) will be described below with reference to FIG. 2.

If the policy for accepting the customized location tracking service of the present invention is determined in operation S100, whereby an authorization policy is registered, the procedure proceeds to operation S100 whereby a location information notification condition is configured by the tracker. A tracking device 120 can determine the notification condition by various methods.

The notification condition may be in association with local location information or temporal location information. In some cases, the notification condition may be a condition in which the local location information and the temporal location information are properly combined. Various embodiments implemented under these notification conditions will be described below in greater detail with reference to FIG. 3.

The tracking device 120 requests location information on a tracked device 140. The tracking device 120 is not limited to a mobile terminal as shown in FIG. 1, and thus various mobile terminals capable of interactive communication may be used. Examples of the tracking device 120 may include all kinds of portable terminals (e.g. a mobile phone, a personal communication service (PCS) phone, a personal digital assistant (PDA), etc), a laptop computer, a general desktop computer, and an Internet TV (all of which not shown). In general, the tracking device 120 has a display unit that displays location information. However, the present invention is not limited thereto. Thus, as long as a buffer is built in so as to store the location information, the location information may be displayed on or transmitted through an additional display unit by a user interface.

Instead of a mobile terminal used for wireless communication, if the tracking device 120 is a desktop computer or Internet TV, the tracking device 120 may be connected to a location information server 130 by a wired network instead of a wireless network.

After operation S110 of configuring a notification condition, the tracking device 120 performs operation S120 of requesting a service from the location information server 130 under the notification condition. Upon receiving the service request, the location information server 130 checks for the location information notification condition requested by the tracker. If the condition is satisfied, the location information on the trackee is provided to the tracking device 120.

Although not shown, an operation of authenticating the tracker may be optionally performed prior to the customized location information service of the present invention. Service request data, which is transmitted when the tracking device 120 requests a service for the authentication operation, may include user authentication information. Since the user authentication information is confidential information, an operation of forming a secure channel may be performed prior to the authentication operation between the tracking device 120 and the location information server 130. The user information is transmitted to the location information server 130 through the secure channel. The location information server 130 starts to provide the location information if authentication is successful in the operation of authenticating the tracker on the basis of the transmitted user information. If the authentication is not successful, the service is not provided but terminated. After the location information server 130 provides the location information on the trackee at the request of the tracker, the location information server 130 stands by until an event controller notifies that an event has been generated. The event generation occurs when the location information on the trackee is modified, or a predetermined time has passed, or a service termination request is received. By utilizing the event controller, a redundancy problem can be solved which occurs when the location information server 130 continuously transmits the location information on the tracked device 140 to the tracking device 120 or stores the location information in the buffer. As a result, buffer efficiency can be enhanced, and an excessive interruption of task of the location information server 130 can be prevented. For example, if the trackee remains at a fixed location, it would be inefficient and wasteful to continuously update and store the location information. Instead, the event controller may be efficiently used so that the location information is updated only when the location changes significantly. If the notification condition is determined to a specific time slot, the event controller may generate a specific event when the time slot is over so as to execute an interrupt for terminating the customized location tracking service.

The location information server 130 monitors the location information on the tracked device 140 via a base station 150. The tracked device 140 may be a mobile terminal such as a mobile phone, a PCS phone, a PDA, or a palmtop computer. In some cases, the tracked device 140 may be an interactive communication device built into a transportation vehicle such as a train, a ship, or an automobile.

The tracked device 140 may include a receiver that receives the location information from the location information server 130 and a transmitter that transmits the location information to the location information server 130. When using the non-configuration policy or the pending policy, the tracked device 140 receives an additional request on an authorization policy from the location information server 130 and transmits a proper authorization policy in order to provide a relevant service.

Figure 2B:
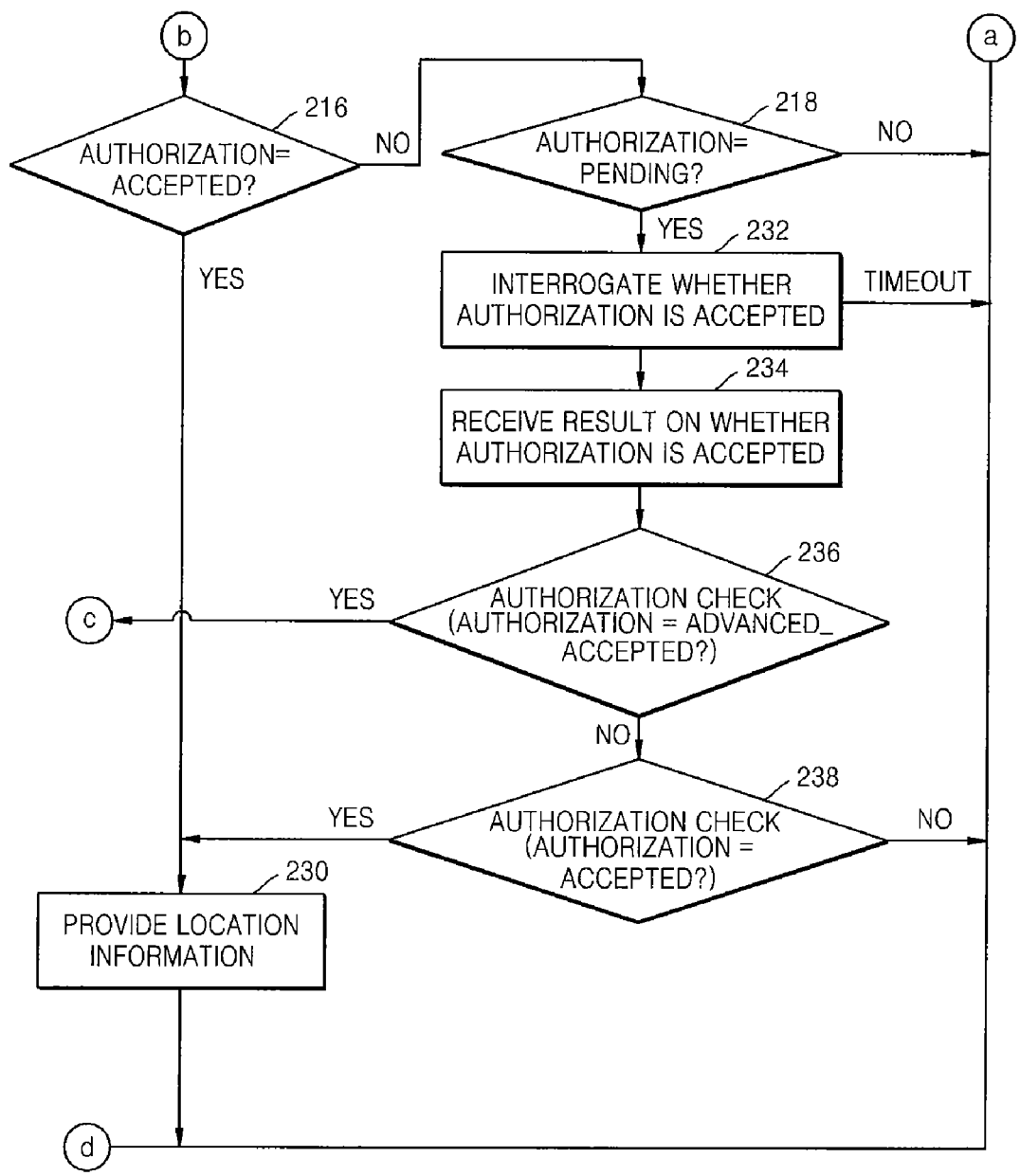
FIG. 2B is a flowchart of a procedure to be combined with that of FIG. 2A in order to show the whole procedure performed in the location information server.

FIG. 2A is a flowchart of a procedure performed by a location information server that provides a customized location tracking service on the basis of an authorization policy according to an embodiment of the present invention. FIG. 2B is a flowchart of a procedure to be combined with that of FIG. 2A in order to show the whole procedure performed in the location information server.

First, a service request message for requesting the location tracking service is transmitted from a tracking device to a location information server (operation 210). In general, the service request message contains user authentication information. For secure communication, a secure channel is established between the tracking device and the location information server before the service request message is transmitted. According to the user authentication information transmitted together with the service request message, the location information server checks for user authentication (operation 212). If the authentication is not successful, the service is terminated. In this case, the location information server transmits an authentication failure message (e.g. "authentication failure") to the tracking device. Thus, a tracker can recognize that a service permission has not been granted. If the authentication is successful, the location information server may optionally send a message (e.g. "authentication successful") to the tracker. Thereafter, a service provision method is determined according to an authorization policy (operation 214). As described above, the authorization policy may include (1) a policy that accepts only a conventional intermittent location tracking service, (2) a policy that accepts a customized location tracking service, (3) a pending policy or a non-configuration policy that does not determine an additional authorization policy, and (4) a policy that rejects a location tracking service.

The following descriptions assume that the authorization policy is that of (2) that accepts a customized location tracking service (authorization=advanced_accepted). In this case, according to the procedure of the present invention, an operation of analyzing the location information notification is performed by the tracker. Thereafter, according to the notification condition, the location information server provides the location information on a trackee. Specifically, the location information server checks for whether a condition for providing the location information is satisfied on the basis of the notification condition (operation 220). If it is satisfied, customized location information is provided (operation 222). At this moment, an event controller waits for an event (operation 224). As described above, an interrupt for the occurrence of an event is received when a specific event (e.g. location change, time slot over, etc) takes place (operation 226), and it is determined whether the specific event is an event for terminating the location tracking service (operation 228). If the event directs to terminate the location tracking service, the service is terminated, and otherwise, the procedure returns to operation 200 of configuring the notification condition. Thereafter, the operation of providing the location tracking service is repeated on the basis of the notification condition.

Now, the following description assumes that the authorization policy is that of (1) that accepts only the conventional intermittent location tracking service (authorization=accepted) (operation 216). If this is the case, the condition of "authorization=advanced_accepted" is not satisfied in operation 214. Thus, the procedure proceeds to operation 216 of FIG. 2B. The trackee provides location information once at the request of the tracker (operation 230) and then no longer provides the location information, and the service is then terminated. Accordingly, the tracking device has to request the service whenever the location tracking information is required, causing inconvenience.

Now, it will be assumed that the authorization policy is the pending policy or non-configuration policy of (3) that does not determine an additional authorization policy (authorization=pending). If this is the case, referring to FIG. 2B, the location information service additionally asks the trackee whether an authorization policy on the tracker is accepted (operation 232). After determining whether authorization is accepted or not, the authorization policy determined by the tracked device is received (operation 234). Then, location information is intermittently provided on the basis of the authorization policy, or the customized location policy is provided.

Lastly, it will be assumed that the authorization policy is that of (4) that rejects a location tracking service. If this is the case, the trackee refuses to provide the location information, and thus, referring to FIG. 2B, the result of operation 218 is negative. Therefore, the procedure is terminated without providing the service. Optionally, the location information server may send a message of "service terminated" to the tracking device so that the tracking device recognizes that the service will no longer be provided.

Figure 3:
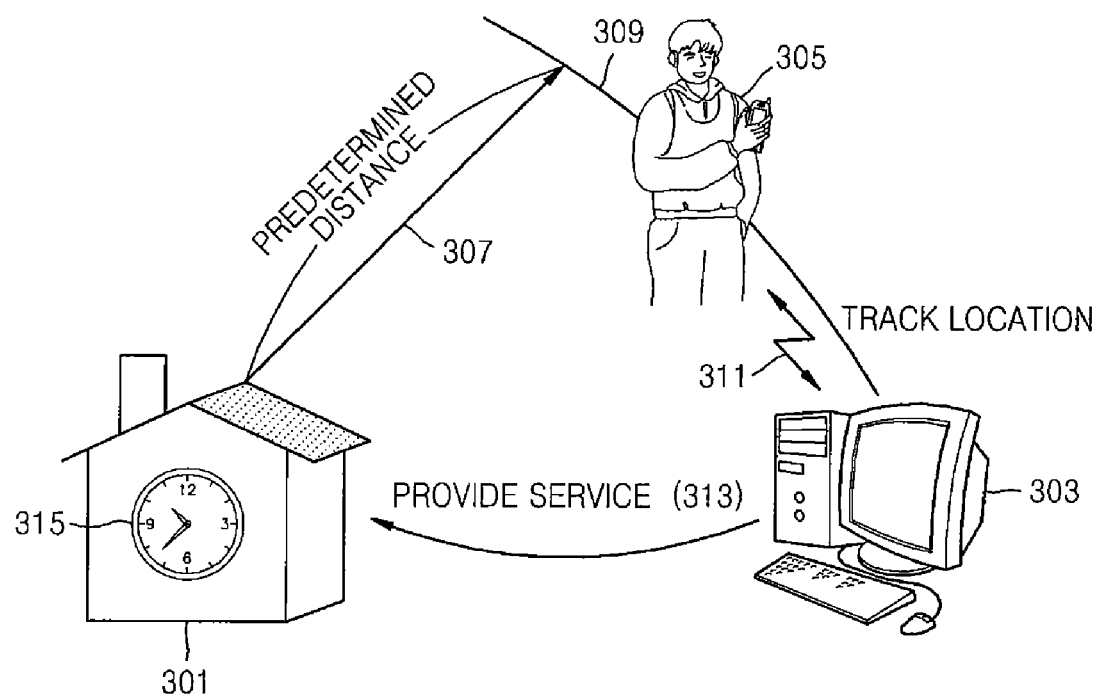
FIG. 3 is a schematic view illustrating a location tracking service on the basis of a notification condition according to an embodiment of the present invention.

FIG. 3 is a schematic view illustrating a location tracking service on the basis of a notification condition according to an embodiment of the present invention. The notification condition may be determined in various manners according to customers' needs. For example, referring to FIG. 3, regarding a notification condition based on location information, the location information may be provided to a tracker 301 under the condition that a trackee 305 is out of a specific area 309 or is farther than a predetermined distance 307 from the tracker 301. On the other hand, the location information may be provided under the condition that the trackee 305 enters the specific area 309 or is within the predetermined distance 307 from the tracker 301. The tracker 301 may allow the predetermined distance 307 from the tracker 301 to be included in the notification condition. Specifically, a small terminal used as the tracked device according to the embodiment of the present invention may be carried by children for the purpose of lost child prevention or may be carried by senior citizens who suffer from senile dementia, in order to know their whereabouts. By doing so, when a child is farther than the predetermined distance 307 from home, or when a child in a public garden or an amusement park moves farther than the predetermined distance 307 from his or her parents, the location tracking service immediately starts so that the parents can locate the child by using terminals.

The present embodiment may also be applicable not only when the trackee is father than the predetermined distance 307 but also when the trackee is within the predetermined distance 307. For example, a proxy driving service provider may attempt to send a short message service (SMS) publicity message to customers who have an experience of using a proxy driving service. In this case, publicity will be effective if the message is sent to customers who are in the area where the proxy driving service is available. The example may be further effective if the notification condition is combined with a temporal condition as well as a local/spatial condition. For example, the notification condition may be determined so that the location information can be provided only when existing customers dine with coworkers within a predetermined distance from a proxy driving service provider (as indicated by 315 in FIG. 3). As a result, the location tracking service is only provided when necessary, thereby attracting prospective customers.

Of course, it is natural that the notification condition may be determined not only under the local/spatial condition but also under the temporal condition alone. For example, for a schoolchild, the location information may be received for a specific period of time after school.

Figure 4:
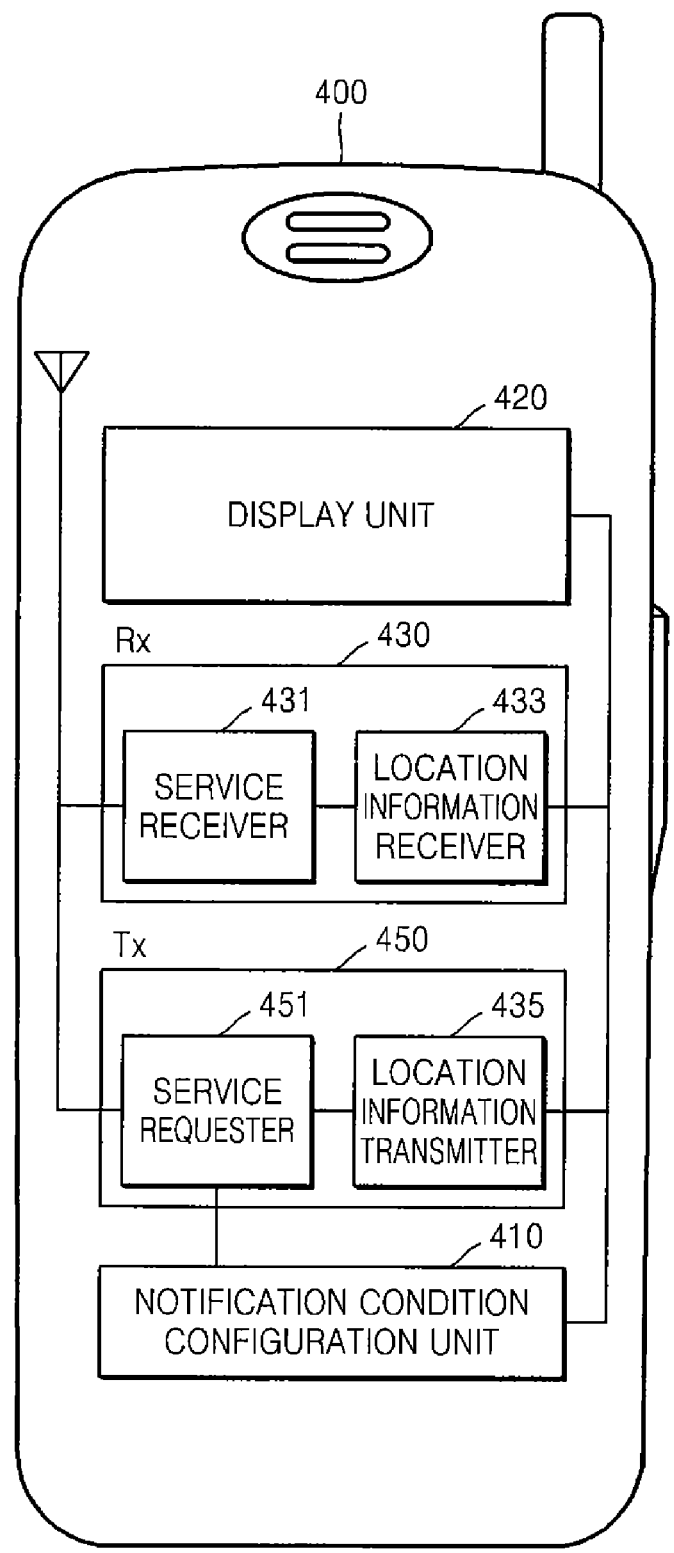
FIG. 4 is a block diagram of a mobile terminal used as a tracking device and/or a tracked device of a location tracking service according to an embodiment of the present invention.

FIG. 4 is a block diagram of a mobile terminal 400 used as a tracking device and/or a tracked device of a location tracking service according to an embodiment of the present invention. Although the mobile terminal 400 is shown in the form of a general mobile phone in FIG. 4, as described above, the mobile terminal 400 may be a portable hand-held stand-alone terminal. Furthermore, the mobile terminal 400 may be a terminal built into a transportation vehicle.

Referring to FIG. 4, the mobile terminal 400 may be used by either a tracker or a trackee. The mobile terminal 400 includes a service requester 451, a notification condition configuration unit 410, and a service receiver 431. Furthermore, the mobile terminal 400 includes a location information receiver 433 and a location information transmitter 435 which are necessary elements for a tracked device. The mobile terminal 400 may include a display unit 420 that displays notification condition settings, location information, and a message to be exchanged with another device. The service receiver 431 and the location information receiver 433 may be provided together with a receiver 430 that receives information from an external device, or may be integrated into the receiver 430 as one unit. Likewise, the service requester 451 and the location information transmitter 435 may be provided together with a transmitter 450 or may be integrated into the transmitter 450 as one unit. The notification condition configuration unit 410 may operate in connection with a central processing unit (CPU) or a processor included in the mobile terminal 400. The notification condition may be configured by a user interface of the mobile terminal 400 such as buttons or keys. Although not shown, the mobile terminal 400 may include a processor unit so as to control various operations. Furthermore, the mobile terminal 400 may include a buffer that acts as a memory space to store various information or messages.

Figure 5:
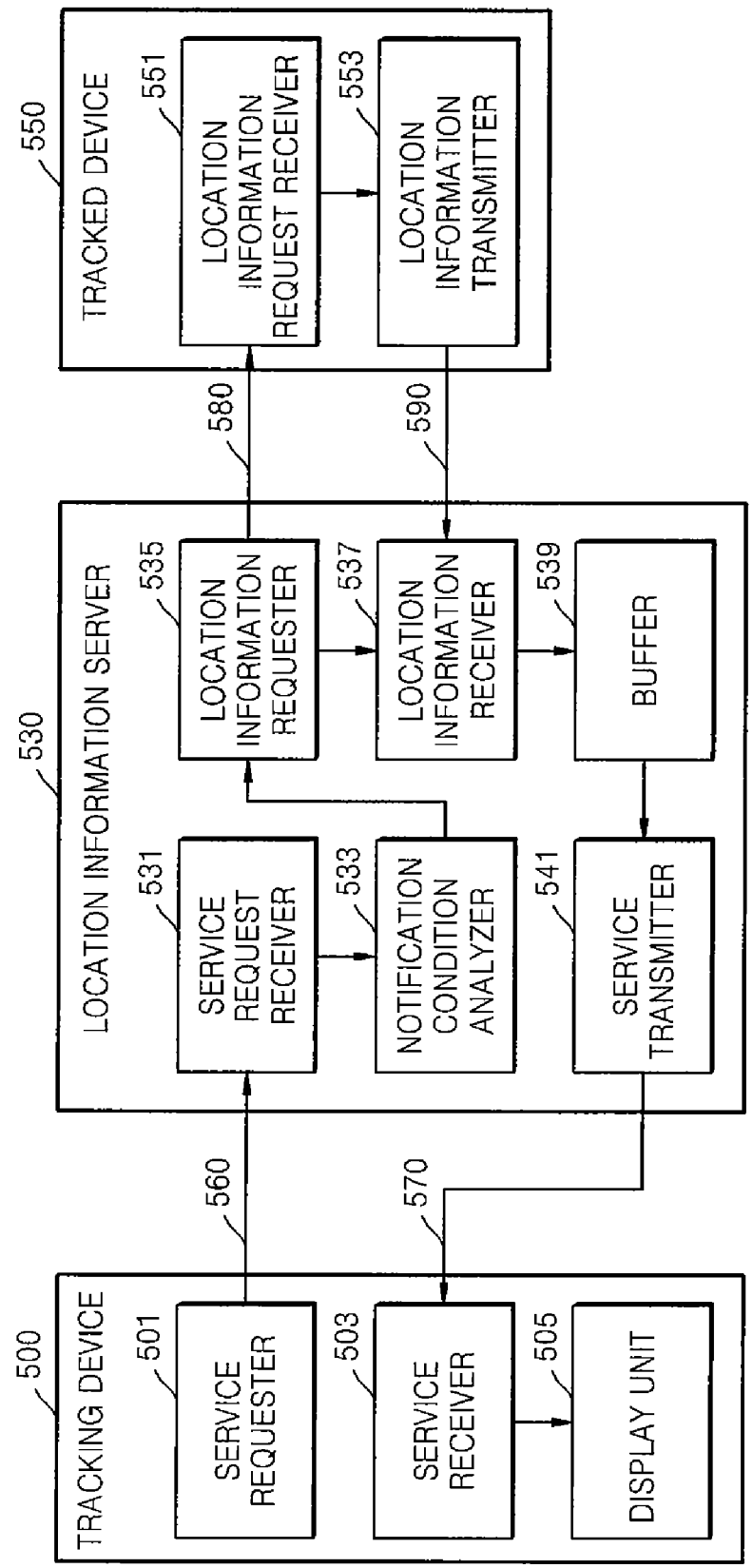
FIG. 5 is a block diagram of an overall system that provides a location tracking service according to an embodiment of the present invention.

FIG. 5 is a block diagram of an overall system that provides a location tracking service according to an embodiment of the present invention. A service requester 501 in a tracking device 500 sends a service request to a location information server 530. Then, a service request receiver 531 in the location information server 530 receives the service request. A notification condition analyzer 533 in the location information server 530 analyzes a notification condition. The location information server 530 sends a location information request (as indicated by 580 in FIG. 5) to a tracked device 550. When the location information is received from the tracked device 550 (as indicated by 590 in FIG. 5), the location information is received by location information receiver 537. The location information may be temporarily stored in a buffer 539. In association with the notification condition, an event controller (not shown) determines whether the location information will be transmitted or whether the service will be terminated. If the location information is determined to be transmitted, the location information is transmitted by a service transmitter 541 (as indicated by 570 in FIG. 5). The tracking device 500 displays content of the received service on a display unit 505.

According to the present invention, unlike the conventional service which has intermittently provided location information on a trackee at the request of a tracking device, a location information service can be periodically provided so as to know the location of the trackee on the basis of a notification condition determined by a tracker without having to request the service each time. Since the location tracking service is provided for the convenience of users under the current situation where a mobile terminal is widely used, the present invention is expected to be used in applications such as lost child prevention and efficient business/service advertisement.

While the present invention has been particularly shown and described with reference to exemplary embodiments thereof, it will be understood by those skilled in the art that various changes in form and detail may be made therein without departing from the spirit and scope of the present invention as defined by the appended claims.

What is claimed is:

1. A method of providing a customized location tracking service, comprising:
   (a) registering an authorization policy of a trackee in order to determine whether a location tracking service requested by a tracker will be accepted;
   (b) configuring a customized location information notification condition by a tracker;
   (c) requesting the customized location tracking service by the tracker; and
   (d) providing the customized location tracking service by a location information server on the basis of the registered authorization policy and the customized location information notification condition,
   wherein the authorization policy of the trackee comprises:
      a policy that accepts only an intermittent location tracking service;
      a customized location tracking policy;
      a pending policy or non-configuration policy that does not determine an additional authorization policy; and
      a policy that rejects the location tracking service,
   wherein the customized location tracking service is provided by the location information server on the basis of the location information notification condition only when the authorization policy is configured to the customized location tracking policy.

2. The method of claim 1, wherein if the authorization policy of the trackee is the policy that accepts only an intermittent location tracking service, the customized location tracking service is terminated after providing an intermittent service for notifying information on the current location of the trackee, and if the authorization policy of the trackee is the policy that rejects the location tracking service, the customized location tracking service is terminated without having to provide an additional service.

3. The method of claim 1, wherein if the authorization policy of the trackee is the pending policy or the non-configuration policy that does not determine an additional authorization policy, in (d), the registration of the authorization policy of the trackee is resumed by additionally inquiring the trackee whether the authorization policy for the tracker will be accepted.

4. The method of claim 1, wherein the location information notification condition is a local location information condition and/or a temporal location information condition.

5. The method of claim 4, wherein a local domain is determined by the local location information condition, and/or
   wherein the local location information condition is satisfied when the trackee enters and/or leaves the specific area.

6. The method of claim 5, wherein the temporal location information condition is satisfied when the location information is periodically transmitted, and/or when the location information is transmitted at a specific time slot, and/or when the location information is transmitted at one or more different time points.

7. The method of claim 1, the method further comprising authenticating the tracker by the location information server prior to the provision of the customized location tracking service on the basis of the determined authorization policy and the location information notification condition after the customized location tracking service is requested by the tracker.

8. The method of claim 7, wherein when the tracker requests the customized location tracking service, the request further includes authentication information on the tracker in order to authenticate the tracker.

9. The method of claim 7, further comprising, prior to the authenticating of the tracker by the location information server, establishing a secure channel between a tracking mobile terminal and the location information server before the authentication information on the tracker is sent from the tracking mobile terminal to the location information server.

10. The method of claim 7, wherein the location tracking service is terminated when the authentication on the tracker is not successful.

* * * * *